(12) United States Patent
Matsuda et al.

(10) Patent No.: US 7,693,017 B2
(45) Date of Patent: Apr. 6, 2010

(54) OPTICAL DISC DEVICE

(75) Inventors: Takahiro Matsuda, Yokohama (JP); Kouji Fujita, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 778 days.

(21) Appl. No.: 11/493,232

(22) Filed: Jul. 25, 2006

(65) Prior Publication Data

US 2007/0058509 A1   Mar. 15, 2007

(30) Foreign Application Priority Data

Sep. 15, 2005   (JP) ............................. 2005-267859

(51) Int. Cl.
   *G11B 7/00* (2006.01)
(52) U.S. Cl. .............. 369/53.18; 369/44.32; 369/47.33; 369/53.14
(58) Field of Classification Search .............. 369/44.32, 369/47.33, 53.18, 53.14
   See application file for complete search history.

(56) References Cited

U.S. PATENT DOCUMENTS

| | | | | |
|---|---|---|---|---|
| 6,430,127 | B1* | 8/2002 | Tsukihashi | 369/47.33 |
| 6,567,357 | B2* | 5/2003 | Kishimoto et al. | 369/53.14 |
| 7,412,615 | B2* | 8/2008 | Yokota et al. | 713/323 |
| 2001/0004342 | A1* | 6/2001 | Noda et al. | 369/44.32 |
| 2002/0034142 | A1* | 3/2002 | Tani et al. | 369/53.35 |
| 2003/0107965 | A1* | 6/2003 | Kawabe | 369/53.18 |
| 2004/0136280 | A1 | 7/2004 | Fujiune et al. | |
| 2005/0195712 | A1* | 9/2005 | Banjo | 369/53.2 |
| 2005/0243666 | A1* | 11/2005 | Turner et al. | 369/44.28 |

FOREIGN PATENT DOCUMENTS

| | | |
|---|---|---|
| JP | 07-006372 A | 1/1995 |
| JP | 2003-233911 A | 8/2003 |
| JP | 2004-158147 A | 6/2004 |

* cited by examiner

*Primary Examiner*—Wayne R Young
*Assistant Examiner*—Brenda Bernardi
(74) *Attorney, Agent, or Firm*—Townsend and Townsend and Crew LLP

(57) ABSTRACT

In a conventional method for preventing a collision between a lens and an optical disc which uses a control system similar to the servo control of the optical disc, it is feared that, when there is no need to apply the servo, the collision prevention method may not perform its function satisfactorily. In an optical disc device that operates with a part of its functions suspended for reduced power consumption, the conventional method is not enough to avoid the collision between the lens and the optical disc. By arranging the lens/disc collision prevention mechanism independently operable, it is possible to prevent the collision between the lens and the disc even during the operation with limited functions.

16 Claims, 5 Drawing Sheets

OPTICAL DISC DEVICE

INCORPORATION BY REFERENCE

The present application claims priority from Japanese application JP2005-267859 filed on Sep. 15, 2005, the content of which is hereby incorporated by reference into this application.

BACKGROUND OF THE INVENTION

1. Field of the Invention

The present invention relates to a construction of an optical disc and a lens in an optical disc device.

2. Description of the Related Art

Optical disc devices converge a laser beam on an optical disc by a lens to read and write information. These devices employ a servo control for focusing which involves reading a focus deviation from a reflected beam and feeding it back to drive an actuator for the lens so that a spot of the converged laser beam is focused on a recording surface of the optical disc.

As the recording density of optical discs has increased in recent years, a reduction in a diameter of laser spot has been under study. The study includes using a lens of high numerical aperture, which tends to shorten a distance between the lens and the optical disc.

It is therefore feared that when the device is impacted, the lens and the optical disc may easily strike each other.

As a means to avoid collision between the lens and the optical disc, a method has been proposed which, when an impact detected by an impact sensor exceeds a predetermined value, cancels a focus servo and applies a force to the lens causing it to move away from the optical disc (JP-A-2003-233911).

SUMMARY OF THE INVENTION

In the above conventional method that avoids collision between a lens and an optical disc by using an impact sensor and applying a force to the lens upon detecting an impact, since the servo control system is used for the impact, it may not fully function when there is no need to apply the servo.

Among portable devices such as disc camcorder, some perform a control that, if possible, supplies electric power only to a part of the device for reduction in power consumption.

In such devices, while the servo is active, a mechanism to avoid collision between the lens and the disc is in operation, as with the conventional method described above. However, during an operation with limited functions, the collision avoiding mechanism does not work to the full extent. Thus, to fully operate the lens/disc collision avoiding mechanism requires supplying electric power to more parts of the device.

The present invention is aimed at preventing a collision between the lens and the disc when the optical disc device is applied an impact acceleration even in a state with limited functions in use.

This objective is accomplished in an optical disc device having a construction defined in the accompanying claims. With this construction, the collision between the lens and the disc can be prevented and reliability of the optical disc device improved.

Other objects, features and advantages of the invention will become apparent from the following description of the embodiments of the invention taken in conjunction with the accompanying drawings.

DESCRIPTION OF THE EMBODIMENTS

Now, embodiments of this invention will be described as follows.

Embodiment 1

Figure 1:
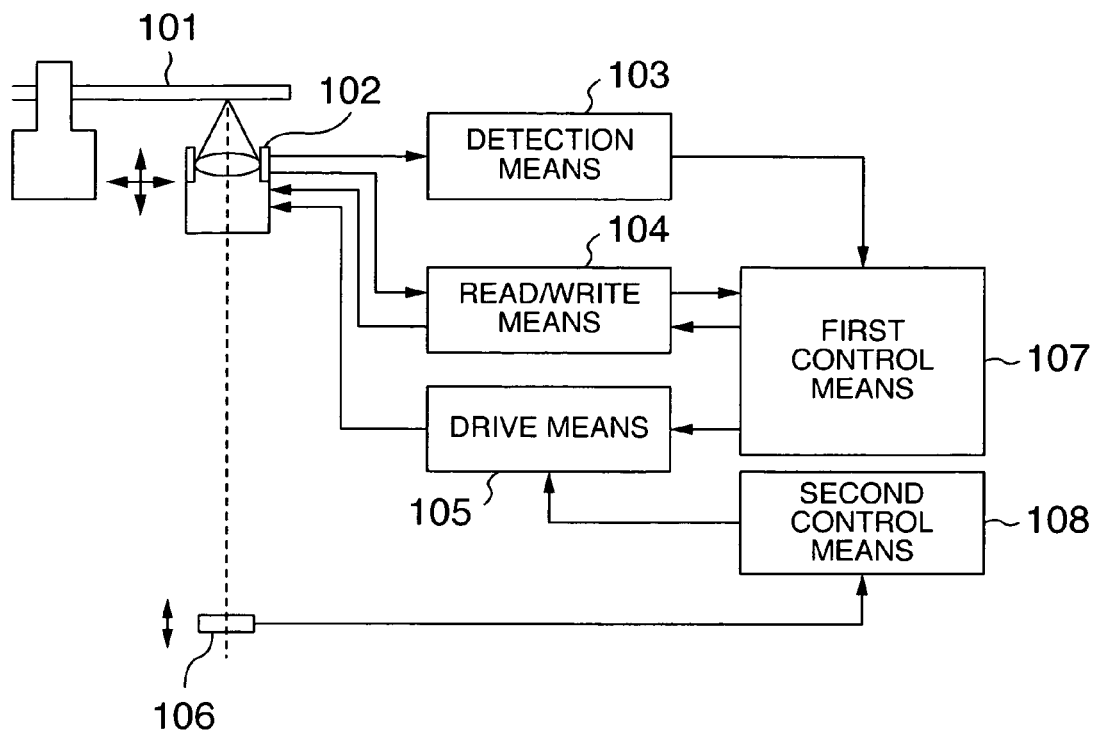
FIG. 1 is an explanatory diagram showing an optical disc device according to a first embodiment.

FIG. 1 is a block diagram showing a configuration of the optical disc device as one embodiment of this invention.

In FIG. 1, denoted 101 is an optical disc; 102 an optical head of a construction capable of driving the lens in a focus direction and in a tracking direction; 103 a detection means to detect a focus shift and a track shift of a beam spot on the optical disc 101 from a reflected beam that the optical head 102 has received from the optical disc 101; 104 a read/write means to read and write information from and to the optical disc 101; 105 a drive means to drive the lens installed in the optical head 102; 106 an acceleration detection means to measure an impact acceleration applied to the device; 107 a first control means to control the detection means, the read/write means and the drive means; and 108 a second control means capable of being operated independently of the first control means 107.

For accurate positioning of the beam spot on the disc, the first control means 107 controls the drive means 105 to drive the lens according to the focus shift and tracking shift detected by the detection means 103 and thereby adjusts the position on the beam spot on the optical disc. The first control means 107 also performs the read/write control on the read/write means 104. The first control means does not have to be constructed as described above as long as it has a function to drive the lens according to at least the focus shift. It may also have a function to perform other controls.

The first control means 107 can stop or temporarily halt its operation when the position control on the beam spot on the disc is not necessary. At this time, the second control means 108 comes into operation to control the lens installed in the optical head 102 by the drive means 105 according to the acceleration detected by the acceleration detection means 106.

When the second control means 108 performs the control to avoid a collision between the lens and the optical disc, it is not necessary to operate all of the functions of the drive means 105. The second control means 108 need only be able to control at least the function of driving the lens only in the focus direction, and the other functions may be stopped or temporarily halted.

When the second control means 108 is in operation and the first control means 107 is at rest, the detection means 103 and the read/write means 104 may be halted. At this time, the power supply to the first control means 107, the detection means 103 and the read/write means 104 may be stopped, thus reducing the power consumption of the device as a whole.

The drive means 105 may normally be put in a rest state when the second control means 108 is in operation. When an impact acceleration is detected by the acceleration detection means 106, the drive means 105 may be brought back from the rest state into operation by the second control means 108. While the drive means 105 is at rest, power supply to the drive means 105 may be stopped. When an impact acceleration is detected, the power supply may be resumed to drive the lens. This configuration can minimize the power consumption of the entire device and still prevent a collision between the lens and the disc.

Since the second control means is provided separate from the first control means, the second control means can be operated independently of the first control means to drive the lens by the drive means even if the first control means is at rest.

Figure 2:
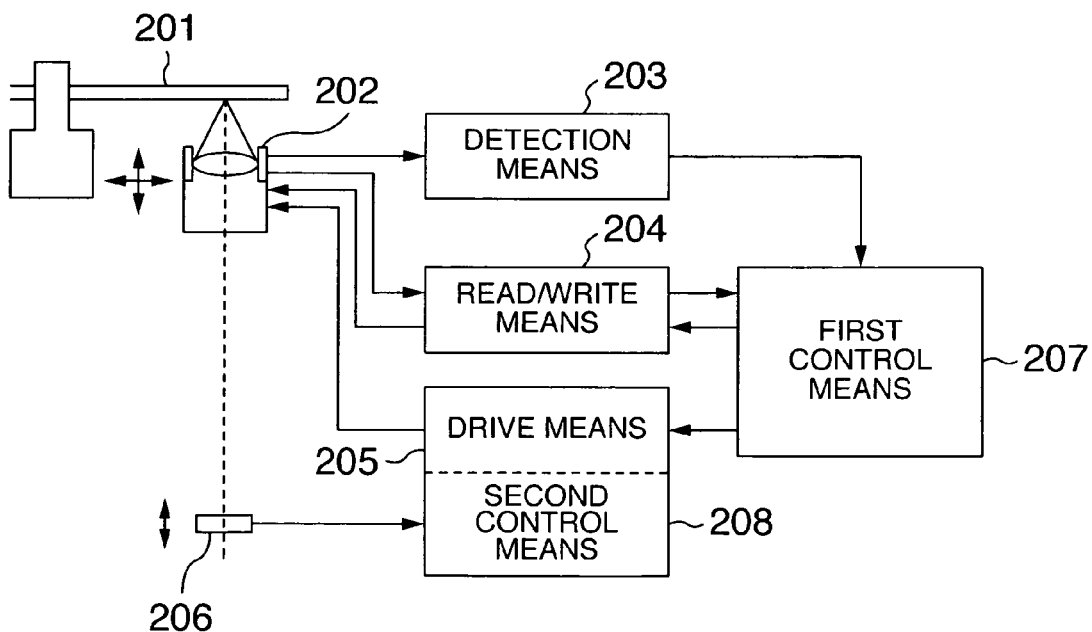
FIG. 2 is an explanatory diagram showing another example of the optical disc device according to the first embodiment.

As shown in FIG. 2, a second control means 208 may be built into a circuit of a drive means 205. In this case, too, the second control means can be operated if the first control means is at rest, requiring no other external circuit for the control of the drive means 205.

Figure 3:
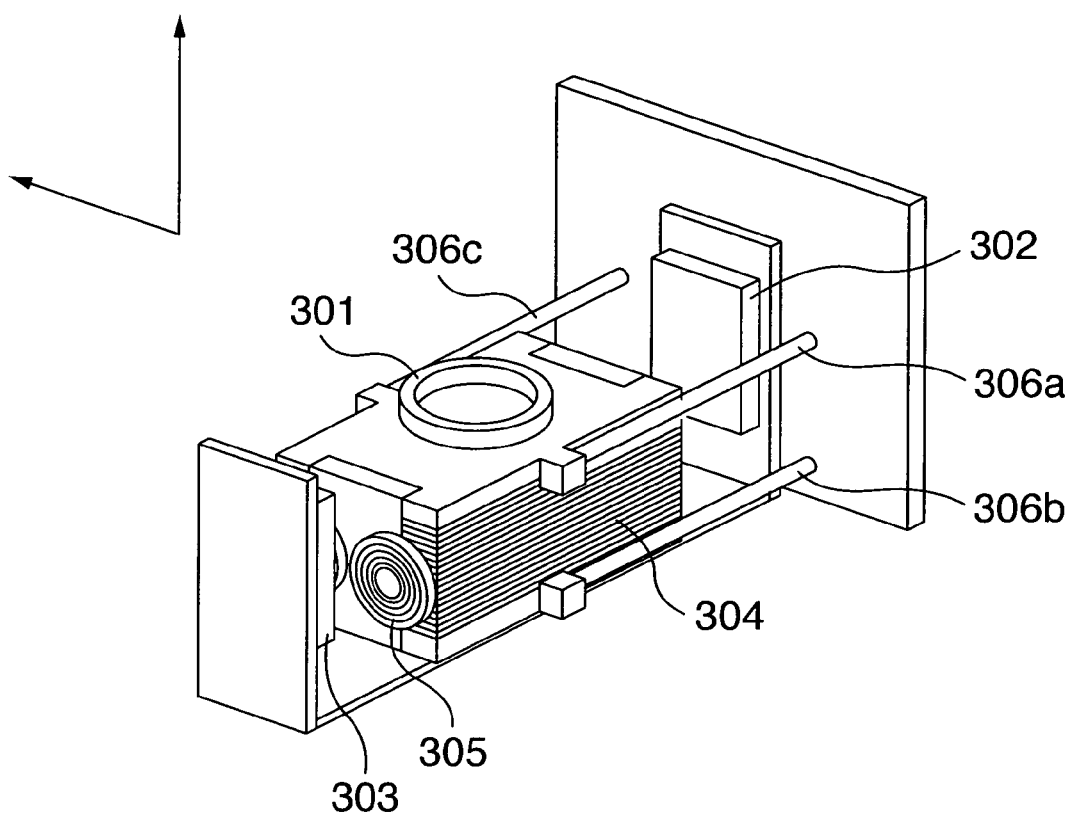
FIG. 3 is a perspective view showing one example of an optical pick-up.

FIG. 3 shows one embodiment of a lens drive unit in the optical head 102. In FIG. 3, denoted 301 is a lens for converging a laser beam onto an optical disc; 302 and 303 permanent magnets to generate a magnetic field; 304 a coil to drive the lens in the focus direction; and 305 a coil to drive the lens in the tracking direction. Though not seen in the figure, a total of four similar coils are provided, with half of them installed on the side opposite the permanent magnet 303. Reference numbers 306a, 306b, 306c represent support springs. There are four of them in all, although not all can be seen.

Passing an electric current through the coil 304 or 305 causes it be moved in the focus direction or tracking direction by magnetic fields generated by the permanent magnets 302, 303. With the optical head of this construction, controlling the currents applied to the coil 304 and coil 305 independently can drive the lens in the focus direction and tracking direction independently. The construction of the lens drive unit in the optical head shown in FIG. 3 is only one example and other construction may be employed if it can drive the lens in the focus direction as in this example.

FIG. 4 shows a position where the acceleration detection means 106 of FIG. 1 can be installed to more effectively prevent a collision between the lens and the disc. In FIG. 4, reference numbers 401a, 401b and 401c represent an optical disc and 402a, 402b and 402c represent a lens that can be moved in two axis directions. Designated 403a, 403b and 403c are an acceleration detection means that has at least one operation axis. 404a and 404b denote a drive axis along which the lens is driven in the focus direction. 405a and 405b denote a drive axis along which the lens is driven in the tracking direction. 406a and 406b denote an operation axis along which the acceleration detection means detect an impact acceleration. 404c denotes an arrow representing a rotary acceleration acting on a device including the lens and the acceleration detection means. 405c represent a rotation center of the rotary acceleration 404c. An arrow 406c represent an acceleration that the lens 402c receives when the acceleration 404c is applied to the device.

Figure 4A:
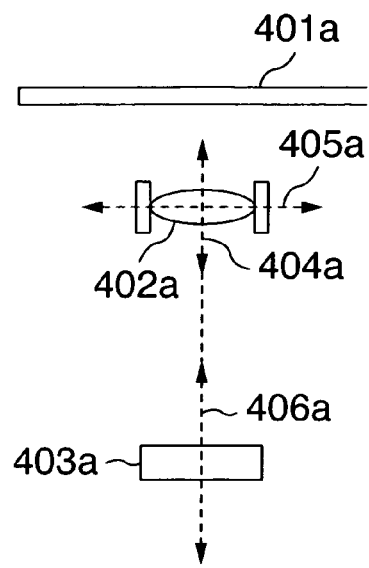
FIGS. 4A-4C are explanatory diagram showing how an acceleration acts on the lens.
Figure 4B:
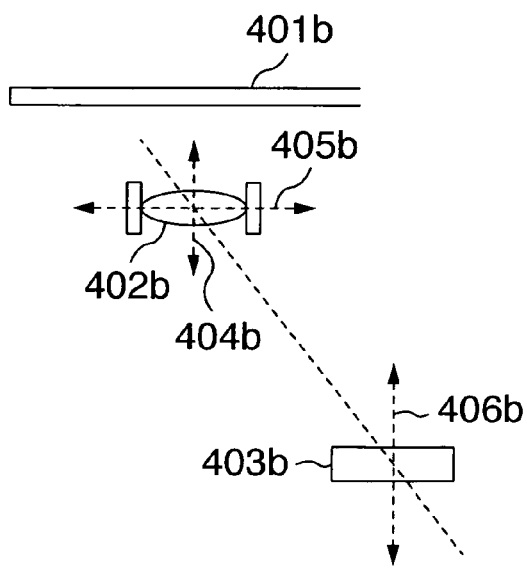
Figure 4C:
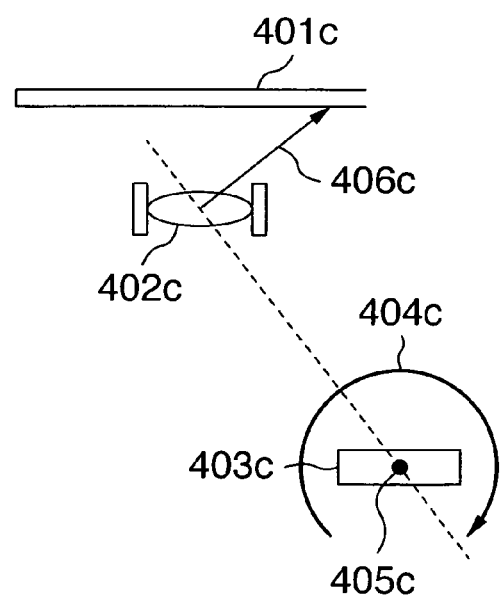

Let us consider an arrangement of the lens and the acceleration detection means, such as shown in FIG. 4A and FIG. 4B. In the arrangement of FIG. 4A, the drive axis for driving the lens 402a in the focus direction and the operation axis along which the acceleration detection means 403a detects an acceleration are put close together and angles of the two axes are set almost equal so that if an rotary acceleration is applied, the acceleration acting on the lens can be detected correctly. In the arrangement of FIG. 4B, the drive axis for the lens 402b in the focus direction and the operation axis for the acceleration detection means 403b are set at almost equal angles but arranged at shifted positions. If a rotary acceleration 404c is applied to the device of the above arrangement with the acceleration detection means at the center, as shown in FIG. 4C, the rotation center is at a point 405c and thus the acceleration detection means 403c detects almost no acceleration. However, the lens 402c is applied with an acceleration 406c that forces the lens and the disc to move closer to each other. It is therefore conceivable that a disc/lens collision prevention mechanism, if provided, may fail to operate correctly.

In the arrangement of FIG. 4A, if a rotary acceleration is applied as shown in FIG. 4C, the acceleration that the lens receives is mostly an acceleration in the tracking direction. So, there is almost no problem. Therefore, by putting closer together the angles and positions of the drive axis in which the lens is driven in the focus direction and the operation axis of the acceleration detection means, as shown in FIG. 4A, the acceleration acting on the lens can be detected more precisely.

Further, in this embodiment, the acceleration detection means 106 may not be one that detects an impact acceleration as long as it can predict a collision between the lens and the disc caused by impacts or vibrations. Other possible acceleration detection means include a lens position detection means for measuring the lens position and a detection means for detecting a relative position or distance between the lens and the disc. When these detection means detect a movement of the lens and the disc closer to each other and their collision is predicted, the lens is driven to avoid the collision between the lens and the disc, as when an impact acceleration is detected in the above example.

Embodiment 2

Figure 5:
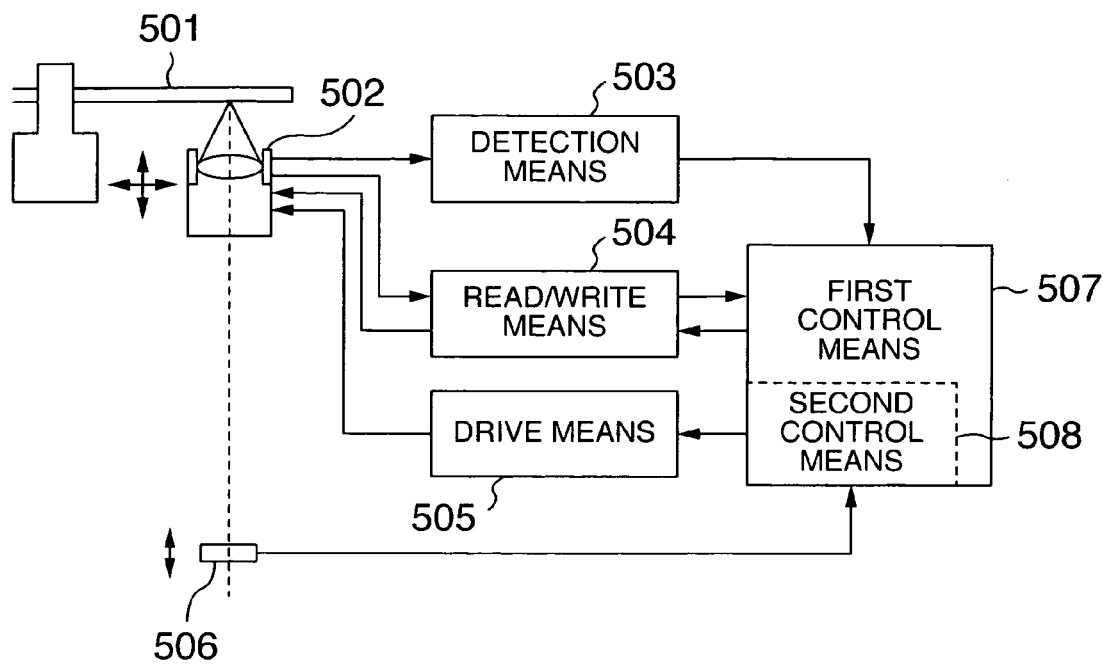
FIG. 5 is an explanatory diagram showing an optical disc device according to a second embodiment.

FIG. 5 shows in a block diagram a configuration of an optical disc device as a second embodiment of this invention.

In FIG. 5, denoted 501 is an optical disc;. 502 an optical head having a construction capable of driving the lens in the focus direction and tracking direction; 503 a detection means to detect a focus shift and a track shift of a beam spot on the optical disc 501 from a reflected beam that the optical head 502 has received from the optical disc 501; 504 a read/write means to read and write information from and to the optical disc 501; 505 a drive means to drive the lens installed in the optical head 502; 506 an acceleration detection means to measure an impact acceleration applied to the device; 507 a first control means to control the detection means, the read/write means and the drive means; and 508 a second control means capable of being operated independently of the first control means 507.

In the example of FIG. 5 also, for accurate positioning of the beam spot on the disc, the first control means 507 controls the drive means 505 to drive the lens according to the focus shift and tracking shift detected by the detection means 503 and thereby adjusts the position on the beam spot on the optical disc, as in the embodiment 1 of FIG. 1. The first control means 507 also performs the read/write control on the read/write means 504. The first control means does not have to be constructed as described above as long as it has a function to drive the lens according to at least the focus shift. It may also have a function to perform other controls.

The first control means 507 can stop or temporarily halt its operation when the position control on the beam spot on the disc is not necessary. At this time, of the functions of the first control means, a function to control the drive means 505 and a function to process a signal from the acceleration detection means 506 are not halted but kept operational. In this state, the second control means 508 controls the lens installed in the optical head 502 by the drive means 505 according to the acceleration detected by the acceleration detection means 506.

The second control means 508 exists in the same circuit as the first control means 507 and, by selectively halting one of the circuits, the function can be limited. Further, the circuit forming the first control means may be configured so that power supply to those blocks to be halted can be stopped. This arrangement allows for the control on the lens/disc collision prevention device which stops the power supply to those functions of the first control means 507 that are not used when the second control means 508 is operated, thereby minimizing power consumption.

As in embodiment 1 of FIG. 1, in performing the control to avoid a collision between the lens and the optical disc, the second control means 508 does not have to operate all of the functions of the drive means 505. The drive means 505 may be set operational only for the function to drive the lens in the focus direction and other functions may be stopped or temporarily halted.

When the second control means 508 is in operation and the first control means 507 is at rest, the detection means 503 and the read/write means 504 may be at rest. At this time, the power supply to the first control means 507, the detection means 503 and the read/write means 504 may be stopped, minimizing the power consumption of the whole device.

The drive means 505 may normally be at rest when the second control means 508 is in operation. When an impact acceleration is detected by the acceleration detection means 506, the drive means 505 may be brought back from the rest state into operation by the second control means 508 to prevent a lens/disc collision. While the drive means 505 is at rest, power supply to the drive means 505 may be stopped. When an impact acceleration is detected, the power supply may be resumed to drive the lens. This arrangement can minimize the power consumption of the device as a whole and still prevent a collision between the lens and the disc.

In this embodiment, the acceleration detection means 506 may not be one that detects an impact acceleration as long as it can predict a collision between the lens and the disc caused by impacts or vibrations. Other possible acceleration detection means include a lens position detection means for measuring the lens position and a detection means for detecting a relative position or distance between the lens and the disc. When these detection means detect a movement of the lens and the disc closer to each other and their collision is predicted, the lens is driven to avoid the collision between the lens and the disc, as when an impact acceleration is detected in the above example.

Embodiment 3

Figure 6:
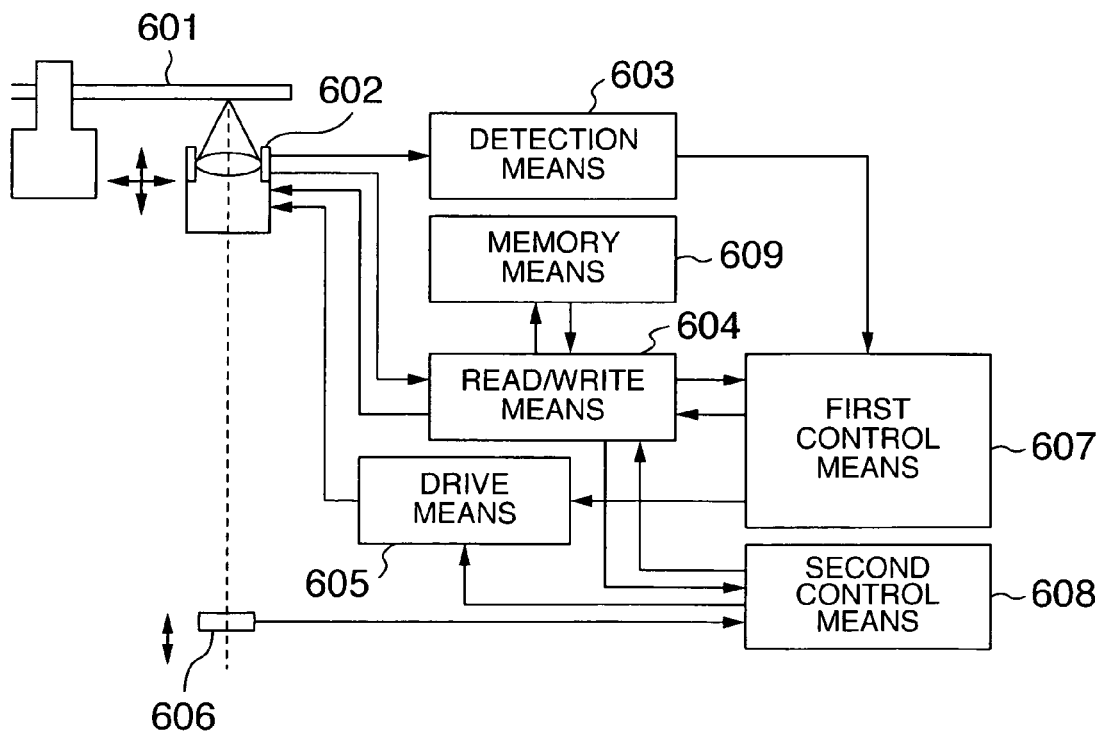
FIG. 6 is an explanatory diagram showing an optical disc device according to a third embodiment.

FIG. 6 in a block diagram a configuration of an optical disc device as a third embodiment of this invention.

In FIG. 6, denoted 601 is an optical disc; 602 an optical head having a construction capable of driving the lens in the focus direction and tracking direction; 603 a detection means to detect a focus shift and a track shift of a beam spot on the optical disc 601 from a reflected beam that the optical head 602 has received from the optical disc 601; 604 a read/write means to read and write information from and to the optical disc 601; 605 a drive means to drive the lens installed in the optical head 602; 606 an acceleration detection means to measure an impact acceleration applied to the device; 607 a first control means to control the detection means, the read/write means and the drive means; 608 a second control means capable of being operated independently of the first control means 607; and 609 a memory means to temporarily store data to be written into the optical disc or data read from the optical disc.

Figure 7:
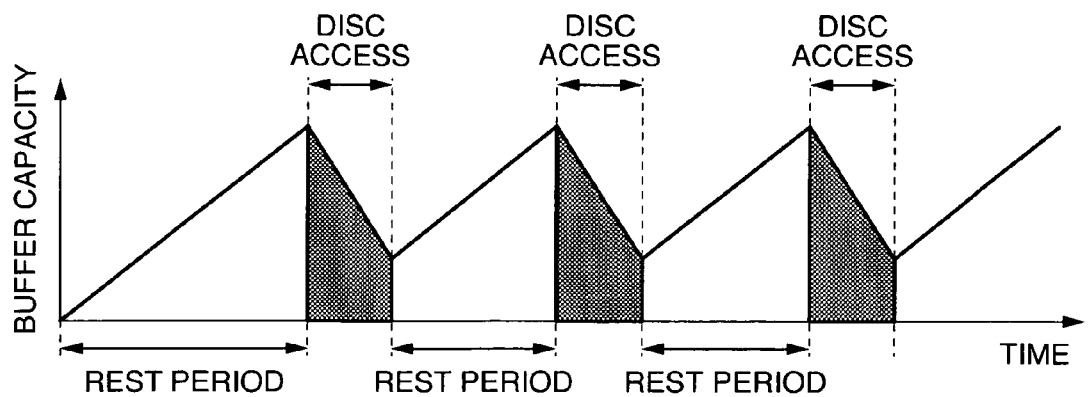
FIG. 7 is an explanatory diagram showing a relation between a buffer capacity and a recording time in an intermittent writing operation of the optical disc device.

The use of the memory means 609 allows the optical disc device of FIG. 6 to perform an intermittent operation during writing and reading. The intermittent operation refers to a read/write method which—in optical disc devices such as camcorders and video recorders that read and write real-time data—accesses an optical disc at a sufficiently higher transfer speed Nt than an average bit rate Nb of real-time data (Nt>>Nb) thereby shortening an actual operation time taken by the optical disc device to access the disc. FIG. 7 illustrates a volume of data accumulated in the memory means during the intermittent writing operation.

When a writing operation is started, the device temporarily accumulates data in the memory means. The data is accumulated in the memory means at a speed associated with the average bit rate Nb of data. When the accumulated data exceeds a predetermined volume, the device writes the accumulated data into the disc at a sufficiently fast speed (associated with the transfer rate Nt to the disc). When the data volume accumulated in the memory means decreases to a certain level after writing data into the disc, the device stops accessing the disc and waits for new data to be accumulated again in the memory means.

The intermittent operation during writing has been explained. During reading, the similar procedure is also taken. That is, the device accesses the disc at the rate Nt, temporarily accumulates the data read from the disc into the memory means, reads the accumulated data at the rate Nb and, each time the accumulated data in the memory means decreases below a certain level, accesses the disc to read data.

In the device that performs such an intermittent operation, while the disc is not accessed, there is no need to perform the positioning of a beam spot by adjusting the optical head 602 according to the focus shift and track shift detected by the detection means 603. Thus, during a period when the device is not accessing the disc by the intermittent operation, the control means 608 executes only the function of avoiding a collision between the lens and the disc caused by impact accelerations.

During a period when the disc is accessed, the first control means 607 activates the read/write function and the beam spot positioning function. By switching between the control means according to the state of the intermittent operation, it is possible to operate the device efficiently while avoiding a disc/lens collision caused by impacts.

During a period when the disc is not accessed, the detection means 603 may be at rest while the second control means 608 is in operation. During this rest state, the supply of electricity to the detection means 603 may be stopped. Also during the period that the disc access is not performed, if the second control means 608 is operating, the drive means 605 may normally be at rest. When an impact acceleration is detected by the acceleration detection means 606, the drive means 605 may be brought back into operation by the second control means 608 to drive the lens. Further, while the drive means 605 is at rest, the supply of electricity to the drive means 605 may be stopped. The supply of power may be resumed upon detection of an impact acceleration to activate the drive means 605. This arrangement reduces power consumption of the device and still prevents a collision between the lens and the disc.

It is also noted that, while the disc is accessed, the second control means does not have to be at rest but may operate at the same time that the first control means operates. When an impact acceleration is detected by the acceleration detection means, the second control means may operate the drive means 605 to prevent a lens/disc collision.

In this embodiment, the second control means 608 may be built into the first control means 607 or drive means 605, as in the case of embodiment 1 or embodiment 2. Further, when the second control means 608 controls the drive means 605, the drive means 605 needs only to be operational in at least the function of driving the lens 602 in the focus direction.

Further, in this embodiment, the acceleration detection means 606 may not be one that detects an impact acceleration as long as it can predict a collision between the lens and the disc caused by impacts or vibrations. Other possible acceleration detection means include a lens position detection means for measuring the lens position and a detection means for detecting a relative position or distance between the lens and the disc. When these detection means detect a movement of the lens and the disc closer to each other and their collision is predicted, the lens is driven to avoid the collision between the lens and the disc, as when an impact acceleration is detected in the above example.

Embodiment 4

Figure 8:
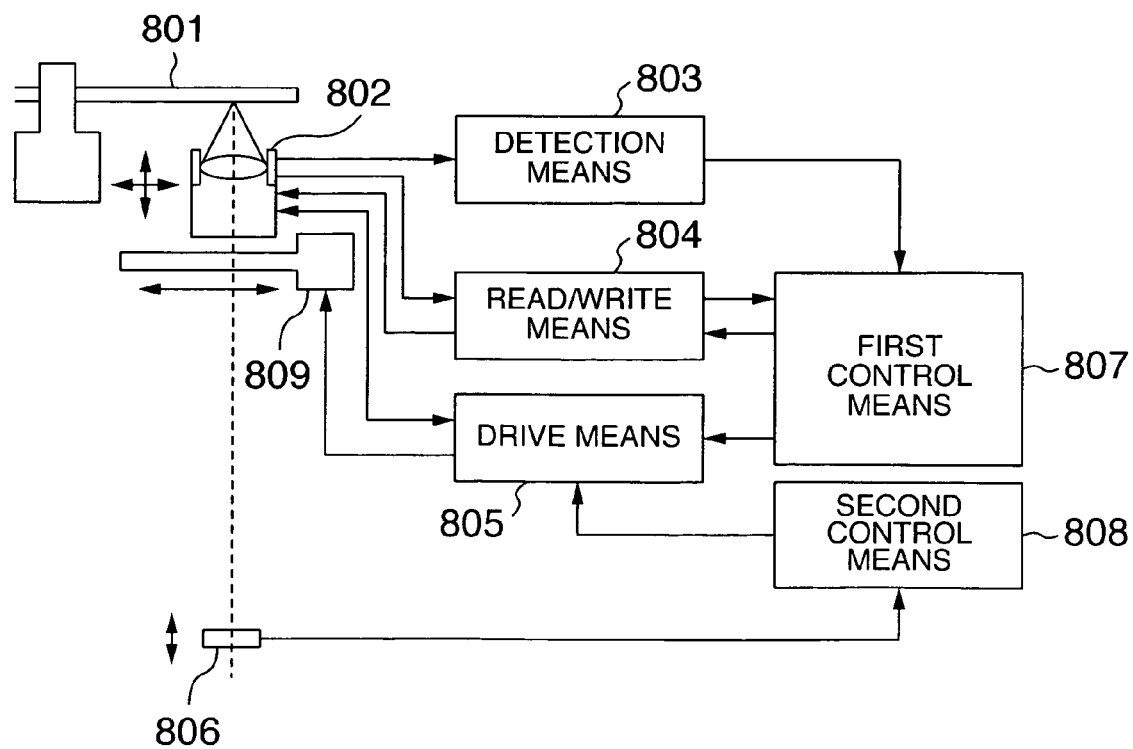
FIG. 8 is an explanatory diagram showing an optical disc device according to a fourth embodiment.

FIG. 8 shows in a block diagram a configuration of an optical disc device as a fourth embodiment of this invention.

In FIG. 8, denoted 801 is an optical disc; 802 an optical head having a construction capable of driving the lens in the focus direction and tracking direction; 803 a detection means to detect a focus shift and a track shift of a beam spot on the optical disc 801 from a reflected beam that the optical head 802 has received from the optical disc 801; 804 a read/write means to read and write information from and to the optical disc 801; 805 a drive means to drive the lens installed in the optical head 802; 806 an acceleration detection means to measure an impact acceleration applied to the device; 807 a first control means to control the detection means, the read/write means and the drive means; 808 a second control means capable of being operated independently of the first control means 807; and 809 a sled motor to move the entire optical head 802 in a radial direction of the optical disc.

The device of FIG. 8 has a retraction function which, at time of device power interruption or operation halt, moves the optical head 802 by the sled motor 809 to a position where the optical disc 801 and the lens installed in the optical head 802 do not strike each other.

When the retraction function is activated, while the optical head is moving to the predetermined position, the device does not need to perform the positioning of a beam spot on the optical disc nor activate the read/write means. Thus, during the retraction operation, the first control means 807 is suspended. To prevent a collision between the disc and the lens when the head is moved to the predetermined position, the second control means 808 is operated. The second control means 808 puts into an operational state a drive means for driving at least the acceleration detection means 806 and the lens 802 and drives the sled motor 809 to move the optical head 802 while at the same time driving the lens in the optical head 802 according to the detected impact acceleration to prevent a collision between the optical disc and the lens.

In this embodiment, when the first control means 807 comes to rest, the supply of electricity to the first control means 807, the detection means 803 and the read/write means 804 may be stopped. Further, when the first control means 807 is at rest and the second control means 808 is in operation, it is possible to put the drive means 805 in a rest state and, only when the acceleration detection means 806 detects an impact acceleration, activate the drive means 805 to drive the lens 802. In this case, it is also possible to stop the supply of electricity to the drive means 805 which is in the rest state and, upon detection of an impact acceleration by the acceleration detection means 806, resume power supply to bring the drive means 805 back from the rest state into active state to drive the lens 802. This arrangement can reduce power consumption of the device as a whole while preventing a collision between the disc and the lens.

In this embodiment, the second control means 808 may be built into the first control means 807 or drive means 805, as in embodiment 1 or embodiment 2. Further, when the second control means 808 controls the drive means 805, the drive means 805 needs only to be operational in at least the function of driving the lens 802 in the focus direction.

Further, in this embodiment, the acceleration detection means 806 may not be one that detects an impact acceleration as long as it can predict a collision between the lens and the disc caused by impacts or vibrations. Other possible acceleration detection means include a lens position detection means for measuring the lens position and a detection means for detecting a relative position or distance between the lens and the disc. When these detection means detect a movement of the lens and the disc closer to each other and their collision is predicted, the lens is driven to avoid the collision between the lens and the disc, as when an impact acceleration is detected in the above example.

Embodiment 5

In embodiment 1 through embodiment 4, the detection means (103, 203, 603, 803) that detects, from a reflected beam, positional shifts or deviations of a beam spot on the optical disc has a function to measure deflection or inclination of the surface of the optical disc by processing a reflected beam signal from the optical disc. Let the measured quantity of surface deflection or inclination be t.

When the second control means is in operation, if the impact acceleration a detected by the acceleration detection means is larger than a predetermined value A1, a force f associated with the impact acceleration a drives the lens with a predetermined level of force F1 in a direction away from the disc. If the measured surface deflection or inclination t is larger than a predetermined value T1 and if the detected impact acceleration a is a>A2, where A2 is a predetermined value smaller than the predetermined value A1, then the lens is driven with a force F2, which is greater than F1, according to the impact acceleration a in a direction away from the disc. As for the surface deflection or inclination, it is possible to provide a plurality of predetermined values, rather than only one value T1, and change the predetermined value for acceleration detection stepwise. Further, the force f to drive the lens may be set as a quantity determined simply by values t and a.

Further, the surface deflection or inclination t of the optical disc may be measured when the first control means is in operation and handed over from the first control means to the second control means when the operation is switched to the second control means. Or the second control means may control the detection means to measure the same quantity.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical disc device to read and write data from and to an optical disc comprising:
   an optical head having a construction capable of moving a lens in a focus direction;
   a lens driver to drive the lens in the focus direction;
   a focus deviation detector to detect a deviation of the focus;
   a first lens controller to drive the lens driver according to a result of the focus deviation detection to perform a focus position control on the lens;
   an acceleration detector to detect an impact acceleration of the optical disc device; and
   a second lens controller to control a position of the lens by the lens driver according to a result of the acceleration detection;
   wherein, when the optical disc device does not access the optical disc, the second controller controls the position of the lens while the optical disc device reduces power consumption in the first lens controller.

2. An optical disc device to read and write data from and to an optical disc comprising:
   an optical head having a construction capable of moving a lens in a focus direction;
   a lens driver to drive the lens in the focus direction;
   a focus deviation detector to detect a deviation of the focus;
   a first lens controller to drive the lens driver according to a result of the focus deviation detection to perform a focus position control on the lens; and
   an acceleration detector to detect an impact acceleration of the optical disc device;
   wherein, when the optical disc device does not access the optical disc, the optical disc device reduces power consumption in the first lens controller and the first lens controller does not perform the lens position control associated with the lens focus deviation and, according to a result of the acceleration detection, controls the position of the lens by the lens driver.

3. An optical disc device to read and write data from and to an optical disc comprising:
   an optical head having a construction capable of moving a lens in a focus direction;
   a lens driver to drive the lens in the focus direction;
   a focus deviation detector to detect a deviation of the focus;
   a first lens controller to drive the lens driver according to a result of the focus deviation detection to perform a focus position control on the lens; and
   an acceleration detector to detect an impact acceleration of the optical disc device;
   wherein, when the optical disc device does not access the optical disc, while the optical disc device reduces power consumption in the first controller, the lens driver drives the lens according to a result of the acceleration detection.

4. An optical disc device according to claim 1, wherein if, while the lens driver is at rest, the acceleration detector detects an impact acceleration in excess of a predetermined value, the lens driver is brought back from the rest state into operation to drive the lens.

5. An optical disc device according to claim 2, wherein if, while the lens driver is at rest, the acceleration detector detects an impact acceleration in excess of a predetermined value, the lens driver is brought back from the rest state into operation to drive the lens.

6. An optical disc device according to claim 3, wherein if, while the lens driver is at rest, the acceleration detector detects an impact acceleration in excess of a predetermined value, the lens driver is brought back from the rest state into operation to drive the lens.

7. An optical disc device according to claim 1, wherein the acceleration detection means detects an acceleration in at least one axis and has its acceleration detection axis arranged coaxial with a drive axis along which the drive means drives the lens in the focus direction.

8. An optical disc device according to claim 2, wherein the acceleration detection means detects an acceleration in at least one axis and has its acceleration detection axis arranged coaxial with a drive axis along which the drive means drives the lens in the focus direction.

9. An optical disc device according to claim 3, wherein the acceleration detection means detects an acceleration in at least one axis and has its acceleration detection axis arranged coaxial with a drive axis along which the drive means drives the lens in the focus direction.

10. An optical disc device according to claim 1, further including:
    a memory device to temporarily store information to be written into the optical disc or information read from the optical disc;
    wherein, by temporarily accumulating data in the memory device during reading or writing of real-time data, the data is written to or read from the disc at a bit rate higher than at least a volume per unit time of the data being written or read thereby reading and writing data in a disc access time shorter than a data read time or data write time;
    wherein, while a disc access is not performed, the lens driver is set in a rest state;
    wherein when, with the driver at rest, the acceleration detector detects an impact acceleration in excess of a predetermined value, the driver is brought back from the rest state into operation to drive the lens.

11. An optical disc device according to claim 2, further including:
    a memory device to temporarily store information to be written into the optical disc or information read from the optical disc;
    wherein, by temporarily accumulating data in the memory device during reading or writing of real-time data, the data is written to or read from the disc at a bit rate higher than at least a volume per unit time of the data being written or read thereby reading and writing data in a disc access time shorter than a data read time or data write time;
    wherein, while a disc access is not performed, the lens driver is set in a rest state;
    wherein when, with the driver at rest, the acceleration detector detects an impact acceleration in excess of a predetermined value, the driver is brought back from the rest state into operation to drive the lens.

12. An optical disc device according to claim 3, further including:
    a memory device to temporarily store information to be written into the optical disc or information read from the optical disc;

wherein, by temporarily accumulating data in the memory device during reading or writing of real-time data, the data is written to or read from the disc at a bit rate higher than at least a volume per unit time of the data being written or read thereby reading and writing data in a disc access time shorter than a data read time or data write time;

wherein, while a disc access is not performed, the lens driver is set in a rest state;

wherein when, with the driver at rest, the acceleration detector detects an impact acceleration in excess of a predetermined value, the driver is brought back from the rest state into operation to drive the lens.

13. An optical disc device according to claim 1, further including:

a retraction means to drive the optical head including the lens in a radial direction to retract it to a predetermined position;

wherein, while the optical head is kept at the retracted position, the first control means is set in a rest state and the lens position is controlled according to the result of the acceleration detection.

14. An optical disc device according to claim 2, further including:

a retraction means to drive the optical head including the lens in a radial direction to retract it to a predetermined position;

wherein, while the optical head is kept at the retracted position, the first control means is set in a rest state and the lens position is controlled according to the result of the acceleration detection.

15. An optical disc device according to claim 3, further including:

a retraction means to drive the optical head including the lens in a radial direction to retract it to a predetermined position;

wherein, while the optical head is kept at the retracted position, the first control means is set in a rest state and the lens position is controlled according to the result of the acceleration detection.

16. An optical disc device according to claim 1, further including:

a measuring device an inclination or deflection of a surface of the disc;

wherein, when the lens is driven according to the impact acceleration, a lens position control sensitivity of the second lens controller is changed based on a result of the measurement of the disc surface inclination or deflection.

* * * * *